(12) United States Patent
Barker

(10) Patent No.: US 11,451,462 B2
(45) Date of Patent: Sep. 20, 2022

(54) AIRCRAFT SYSTEMS WITH BUILT IN TESTS

(71) Applicant: B/E Aerospace, Inc., Winston-Salem, NC (US)

(72) Inventor: John Terence Barker, Overland Park, KS (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/119,898

(22) Filed: Dec. 11, 2020

(65) Prior Publication Data
US 2022/0191121 A1    Jun. 16, 2022

(51) Int. Cl.
| | |
|---|---|
| B64D 13/02 | (2006.01) |
| B64D 13/04 | (2006.01) |
| G05D 16/20 | (2006.01) |
| G06F 7/00 | (2006.01) |
| H04L 43/50 | (2022.01) |
| B64F 5/60 | (2017.01) |
| H04W 4/80 | (2018.01) |
| H04L 67/12 | (2022.01) |

(52) U.S. Cl.
CPC ............... H04L 43/50 (2013.01); B64F 5/60 (2017.01); H04W 4/80 (2018.02); *H04L 67/12* (2013.01)

(58) Field of Classification Search
CPC ........... H04L 43/50; B64F 5/60; H04W 40/80
See application file for complete search history.

(56) References Cited

U.S. PATENT DOCUMENTS

| | | | |
|---|---|---|---|
| 4,774,514 A | 9/1988 | Hildebrandt et al. | |
| 7,588,032 B2 | 9/2009 | Cannon | |
| 8,352,486 B1* | 1/2013 | McGrory | B64F 5/60 |
| | | | 707/765 |
| 8,882,033 B2 | 11/2014 | Rittner et al. | |
| 9,751,629 B2 | 9/2017 | Lang et al. | |
| 10,434,342 B2 | 10/2019 | Klose et al. | |
| 2006/0120181 A1* | 6/2006 | Berbaum | G06F 11/273 |
| | | | 714/E11.17 |
| 2011/0208466 A1 | 8/2011 | Quast | |
| 2012/0259586 A1 | 10/2012 | Shields et al. | |

(Continued)

FOREIGN PATENT DOCUMENTS

| | | |
|---|---|---|
| EP | 3235545 A1 | 10/2017 |
| EP | 3410407 A1 | 12/2018 |

(Continued)

OTHER PUBLICATIONS

Extended European Search Report issued by Examiner Mario Busto, of the European Patent Office, dated Apr. 19, 2022, in corresponding European Patent Application No. 21212338.4.

*Primary Examiner* — Christopher B Robinson
(74) *Attorney, Agent, or Firm* — Locke Lord LLP; Daniel J. Fiorello; Gabrielle L. Gelozin

(57) ABSTRACT

A control system for an aircraft system can include a controller configured to connect to one or more subsystems of the aircraft system, the controller having a built-in-test (BIT) module configured to test the one or more subsystems of the aircraft system and output test data. The control system can include a wireless communication module operatively connected to the controller and configured to receive the output data and to output a wireless signal as a function of the test data.

10 Claims, 1 Drawing Sheet

(56) References Cited

U.S. PATENT DOCUMENTS

2014/0304801 A1* 10/2014 Kauffman ........... H04L 63/1408
726/11
2015/0134194 A1   5/2015 Beaujard et al.
2018/0364707 A1* 12/2018 Bosworth ............ G05D 1/0676

FOREIGN PATENT DOCUMENTS

| EP | 3605853 A1 | 2/2020 |
|----|-----------|--------|
| EP | 3693855 A1 | 8/2020 |
| GB | 2540799 A | 2/2017 |

* cited by examiner

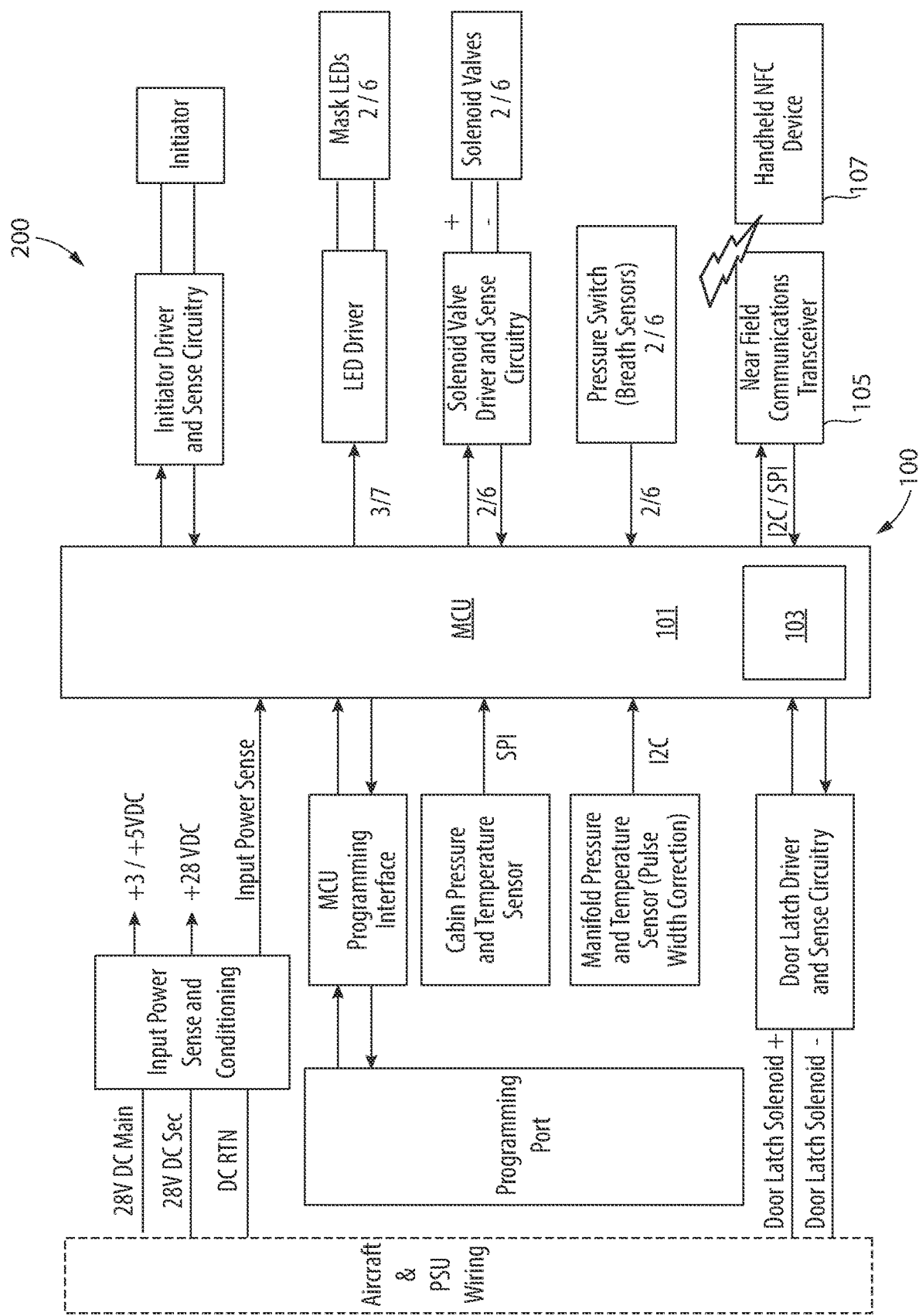

AIRCRAFT SYSTEMS WITH BUILT IN TESTS

FIELD

This disclosure relates to aircraft systems.

BACKGROUND

Aircraft systems that perform built-in-test (BIT) may use aircraft on-board maintenance systems (OMS). These OMS provide a means to log the BIT results obtained via a physical plug-in serial or digital interface that is part of the aircraft system. OMS data is reviewed after a built-in-test (BIT) is performed and not at the point of interrogation. In some cases, the aircraft may not employ OMS. It must therefore use other means to indicate that the system can be found safe to operate or certain maintenance actions performed. Such systems, e.g., for aircraft supplemental oxygen supplies, may use LED flash codes to communicate the BIT result. The flash codes are not intuitive and limited in scope.

Such conventional methods and systems have generally been considered satisfactory for their intended purpose but are subject to human interpretation and thus possible error. As such there is still a need in the art for improved aircraft systems. The present disclosure provides a solution for this need.

SUMMARY

A control system for an aircraft system can include a controller configured to connect to one or more subsystems of the aircraft system, the controller having a built-in-test (BIT) module configured to test the one or more subsystems of the aircraft system and output test data. The control system can include a wireless communication module operatively connected to the controller and configured to receive the output data and to output a wireless signal as a function of the test data.

The wireless communication module can be a near field communication (NFC) transceiver. Any other suitable wireless type of transceiver is contemplated herein, for example. The wireless communication module can be configured to communicate directly with a portable electronic device (PED) of a user, for example.

In certain embodiments, the controller can be configured to encode the test data. The test data can be decoded using a predetermined decoding application on the PED of the user, for example.

In certain embodiments, the one or more subsystems include at least one of a valve driver and sense circuitry, one or more valves, an initiator drive and sense circuitry, an initiator, an input power system, door latch driver and sense circuitry, one or more solenoids, one or more cabin temperature sensor, one or more cabin pressure sensors, one or more manifold pressure sensors, one or more manifold temperature sensors, or one or more pressure switches. Any other suitable subsystems are contemplated herein.

In certain embodiments, the wireless communication module can be configured to output a wireless signal, but not to receive a wireless signal to prevent two way communications for security. Additionally or alternatively, the controller can be configured to output data via the wireless communication module but not to receive data from the wireless communication module to prevent two way communications for security.

In accordance with at least one aspect of this disclosure, an aircraft supplemental oxygen system can include any suitable embodiment of a control system for an aircraft system as disclosed herein, e.g., as described above. The system can further include one or more valves and/or drive circuitry operatively connected to the controller. The system can further include one or more oxygen tanks operatively connected to the one or more valves.

The system can further include one or more initiators and/or initiator driver circuitry operatively connected to the controller to cause fluid communication between the one or more oxygen tanks and the one or more valves. In certain embodiments, the BIT module can be configured to test at least one of the one or more valves, the valve circuitry, the one or more initiators, and/or the initiator driver circuitry.

In accordance with at least one aspect of this disclosure, a computer implemented method can include performing, using a controller, a built-in-test (BIT) on at least one subsystem of an aircraft system to generate test data specific to the controller, and outputting the test data via a wireless communication module to be received by a portable electronic device (PED) of a user. In certain embodiments, outputting the test data can include outputting a near field communication (NFC) signal with the test data.

In certain embodiments, the method can include encoding the test data before outputting the test data. In certain embodiments, the method may include not receiving wireless data via the wireless communication module or not processing received wireless data from the wireless communication module for security. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a schematic diagram showing an embodiment of an aircraft supplemental oxygen system and a control system thereof in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

Referring to FIG. 1, a control system 100 for an aircraft system (e.g., a supplemental oxygen system) 200 can include a controller 101 configured to connect to one or more subsystems of the aircraft system 200. The controller 101 can have a built-in-test (BIT) module 103 configured to test the one or more subsystems of the aircraft system 200 and output test data. The control system 100 can include a wireless communication module 105 operatively connected to the controller 103 and configured to receive the output data and to output a wireless signal as a function of the test data.

The controller 101 can include any suitable hardware and/or software module(s) configured to perform the disclosed function, for example (e.g., the controller 101 can be a microprocessor control unit (MCU) for an oxygen system). The BIT module 103 can include any suitable hardware and/or software module(s) configured to perform the disclosed function, for example.

The wireless communication module 105 can be a near field communication (NFC) transceiver, e.g., as shown. Any other suitable type of transceiver (e.g., Bluetooth) is contemplated herein, for example. For example, the wireless communication module 105 can be configured to communicate directly with a portable electronic device (PED) 107 (e.g., a smartphone or tablet or laptop type computer) of a user, for example.

In certain embodiments, the controller 101 can be configured to encode the test data. The test data can be decoded using a predetermined decoding application on the PED 107 of the user, for example. For example, the predetermined decoding application can be a proprietary software or firmware application or feature that includes a matching algorithm configured to receive and decode the information sent by the wireless communication module 105.

In certain embodiments, as shown, the one or more subsystems include at least one of a valve driver and sense circuitry, one or more valves, an initiator drive and sense circuitry, an initiator, an input power system, door latch driver and sense circuitry, one or more solenoids, one or more cabin temperature sensor, one or more cabin pressure sensors, one or more manifold pressure sensors, one or more manifold temperature sensors, or one or more pressure switches.

Any other suitable subsystems are contemplated herein.

In certain embodiments, the wireless communication module 105 can be configured to output a wireless signal, but not to receive a wireless signal to prevent two way communications for security. Additionally or alternatively, the controller 101 can be configured to output data via the wireless communication module 105 but not to receive data from the wireless communication module 105 (e.g., to not process any received signals) to prevent two way communication for security.

In accordance with at least one aspect of this disclosure, an aircraft supplemental oxygen system 200 can include any suitable embodiment of a control system (e.g., control system 100) for an aircraft system as disclosed herein, e.g., as described above. The system 200 can further include one or more valves and/or drive circuitry operatively connected to the controller 101. The system 200 can further include one or more oxygen tanks (not shown) operatively connected to the one or more valves.

The system 200 can further include one or more initiators and/or initiator driver circuitry operatively connected to the controller 101 to cause fluid communication between the one or more oxygen tanks and the one or more valves. In certain embodiments, the BIT module 103 can be configured to test at least one of the one or more valves, the valve circuitry, the one or more initiators, and/or the initiator driver circuitry.

In accordance with at least one aspect of this disclosure, a computer implemented method can include performing, using a controller, a built-in-test (BIT) on at least one subsystem of an aircraft system to generate test data, and outputting the test data via a wireless communication module to be received by a portable electronic device (PED) of a user. In certain embodiments, outputting the test data can include outputting a near field communication (NFC) signal with the test data.

In certain embodiments, the method can include encoding the test data before outputting the test data. In certain embodiments, the method may include not receiving wireless data via the wireless communication module or not processing received wireless data from the wireless communication module for security. The method can include any other suitable method(s) and/or portion(s) thereof.

Embodiments can be applied to any aircraft system with a BIT that needs to communicate that information, for example. Embodiments can utilize Near Field Communications (NFC), for example. Embodiments can limit direct maintenance costs associated with the aircraft system by allowing maintenance checks to be performed with minimal if any physical need to access each element of an aircraft system, e.g., an oxygen system. Embodiments can utilize a Near Field Communication (NFC) feature to supplement or replace the traditional BIT LED as a means of communicating BIT status information to both on and off-airplane maintenance personnel depending on whether the system is being evaluated as-installed on the aircraft or removed for further maintenance or being readied for installation. In certain embodiments, NFC may be used alone or in combination with an existing CAN interface.

In certain embodiments, the NFC transceiver controls the NFC function in terms of data transmitted. Data is can be communicated from the MCU to the NFC transceiver by an I2C or SPI, for example. Other protocols such as RS232 may be implemented depending on the device. In certain embodiments, the NFC transceiver circuit can broadcast BIT response information obtained from the MCU either continuously or at a constant interval in accordance with NFC protocol and the standard being utilized. In certain embodiments, the wireless communication module 105 can be interrogated before outputting the test data. Any suitable signal/data output scheme is contemplated herein.

A handheld or portable, NFC compatible device can receive and hold BIT response data from each controller polled, for example. These data can then be available for detailed review either on the hand held device at the point of use, or later off-airplane as the information is downloaded to a central database, for example. Using embodiments, maintenance personnel can directly determine specific failures should they be observed and take the appropriate corrective action to address the issue(s). The handheld device can be used to verify the correct fix has been implemented as a means of closing out or recording such failures within the scope of the operator's maintenance logging/recording system, for example.

The transmission of BIT response data by NFC can be limited to when the controller is externally powered and in BIT mode only. In certain embodiments, the controller may be only powered when it is in BIT mode (e.g., during maintenance or inspection), or only in response to an unexpected cabin decompression, for example. In such embodiments, the NFC can be unable to function without an electrical power source being provided to the controller, which means that unauthorized access to the controller is effectively inhibited during normal flight and ground operations for security.

Embodiments can be limited to only out bound transmission of BIT response information data from the controller. In certain embodiments, the NFC communication as described is not associated or connected to the aircraft data network that may be present. Such embodiments can enables only one way communication for security reasons, module not configured to receive communications, only to output information.

Continued airworthiness of the oxygen system depends on the correct interpretation and evaluation of BIT information. Prior art in this field has relied on the integration of a 2-wire controller area network interface (e.g. CAN) to provide a BIT response to a Common Core Computing System (CCS). This CCS may include a dedicated Onboard Maintenance System (OMS). The OMS logs the BIT response data for each controller for access and review by aircraft maintenance personnel after BIT has been completed. Integration of this approach requires considerable effort at both a software and hardware level, and in some cases, either may not be available on other legacy aircraft or prohibitive to implement from a cost-benefit perspective. As such, this may limit the introduction of this type of passenger oxygen system technology onto existing or legacy aircraft.

Embodiments that wirelessly communicate information such as a BIT response message will allow such legacy aircraft to take advantage of these oxygen systems. From a continued airworthiness perspective, the effectiveness of the single BIT LED indicator to reliably and effectively communicate is questioned given the following. With the oxygen system controller being installed behind overhead panels and structure that forms the Passenger Service Unit (PSU) and oxygen module, the on-aircraft maintenance employee may not be able to directly sight the BIT LED. During BIT the oxygen container door is held slightly ajar to facilitate door latch function to be verified, while preventing the passenger masks from deploying. This small gap physically defines the sight line available to the observer. The LED light information will be diffuse due to this lack of direct sight line access to the controller and may therefore be difficult to distinguish. Aside from the BIT LED being held on or off continuously, the LED flash code sequence is not intuitive, there being in embodiments an additional four (4) combinations of flash sequence each of which is time dependent. The number of individual controllers installed on the airplane can be large (upwards of 180 units in certain aircraft). The time taken to verify and manually log the BIT flash code can be significant in overall terms. This will have a detrimental impact on recurring maintenance costs for the operator of the aircraft. The BIT information obtained by viewing the flash code is only specific to a seating location and does not offer any insight into the configuration of the system in terms of serial or part numbers assigned to each controller.

Embodiments can overcome these limitations. For example, in embodiments, the on or off-aircraft maintenance employee need only bring the compatible handheld or portable receiver within range of the controller board NFC transmitter to affect a transfer of data. The rate at which this can be affected is limited to the time taken to verify a successful transmission and capture of the BIT response. Inaccurate interpretation of the BIT LED response could put the continued airworthiness of the system and thus the passenger or crewmember at risk. The accuracy of the NFC data is expected to be improved since it is independent of operator skill and patience and is not dependent on the operator having visual access to the BIT LED. The level of detail and scope as to the content of the BIT response output data significantly exceeds that of the flashing BIT codes. Details specific to the serial and part number of each controller can be directly coupled to the BIT response. This allows the configuration of the aircraft installation to also be verified at the same time as when BIT is performed.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Such software or firmware implementation may be certified as airworthy as part of the aircraft type certification process directly or subsequently as part of supplemental aircraft type certificate. Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may with appropriate configuration controls also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control system for an aircraft system, comprising:
  a controller configured to connect to one or more subsystems of the aircraft system, the controller having a built-in-test (BIT) module configured to test the one or more subsystems of the aircraft system and output test data; and
  a wireless communication module operatively connected to the controller and configured to receive the output data and to output a wireless signal as a function of the test data, wherein the one or more subsystems include at least one of a valve driver and sense circuitry, one or more valves, an initiator drive and sense circuitry, an initiator, an input power system, door latch driver and sense circuitry, one or more solenoids, one or more cabin temperature sensor, one or more cabin pressure sensors, one or more manifold pressure sensors, one or more manifold temperature sensors, or one or more pressure switches.

2. The control system of claim 1, wherein the wireless communication module is a near field communication (NFC) transceiver.

3. The control system of claim 2, wherein the wireless communication module is configured to communicate directly with a portable electronic device (PED) of a user.

4. The control system of claim 3, wherein the controller is configured to encode the test data, wherein the test data can be decoded using a predetermined decoding application on the PED of the user.

5. The control system of claim 1, wherein the wireless communication module is configured to output a wireless signal, but not to receive a wireless signal to prevent two way communication for security.

6. The control system of claim 5, wherein the controller is configured to output data via the wireless communication module but is not configured to receive data from the wireless communication module to prevent two way communications for security.

7. A computer implemented method, comprising:
performing, using a controller, a built-in-test (BIT) on at least one subsystem of an aircraft system to generate test data; and
outputting the test data via a wireless communication module to be received by a portable electronic device (PED) of a user, wherein the one or more subsystems include at least one of a valve driver and sense circuitry, one or more valves, an initiator drive and sense circuitry, an initiator, an input power system, door latch driver and sense circuitry, one or more solenoids, one or more cabin temperature sensor, one or more cabin pressure sensors, one or more manifold pressure sensors, one or more manifold temperature sensors, or one or more pressure switches.

8. The method of claim 7, wherein outputting the test data includes outputting a near field communication (NFC) signal with the test data.

9. The method of claim 8, further comprising encoding the test data before outputting the test data.

10. The method of claim 9, further comprising not receiving wireless data via the wireless communication module or not processing received wireless data from the wireless communication module for security.

* * * * *